United States Patent [19]

Suzuki et al.

[11] Patent Number: 5,019,358

[45] Date of Patent: May 28, 1991

[54] REACTOR WITH HYDROGEN ADSORPTION ALLOY

[75] Inventors: Hiroshi Suzuki; Hiroshi Ishikawa; Keisuke Oguro; Akihiko Kato; Teruya Okada; Shizuo Sakamoto; Hiroyuki Kawashima; Keizo Sakaguchi, all of Osaka, Japan

[73] Assignees: Agency of Industrial Science & Technology; Kurimoto Ltd.

[21] Appl. No.: 241,194

[22] Filed: Sep. 7, 1988

[30] Foreign Application Priority Data

Apr. 1, 1988 [JP] Japan .................................. 63-81839

[51] Int. Cl.$^5$ ............................................. B01J 8/06
[52] U.S. Cl. ..................................... 422/197; 422/312
[58] Field of Search .............................. 422/197, 312; 165/104.12, 160; 62/46.2; 55/269

[56] References Cited

U.S. PATENT DOCUMENTS

| | | | |
|---|---|---|---|
| 4,510,759 | 4/1985 | Sakai et al. ................ | 165/104.12 |
| 4,570,702 | 2/1986 | Stafford et al. ............. | 165/160 |
| 4,661,323 | 4/1987 | Olesen ....................... | 422/197 |
| 4,687,049 | 8/1987 | Golben ....................... | 165/104.12 |
| 4,741,885 | 5/1988 | Herbort et al. .............. | 422/197 |
| 4,819,718 | 4/1989 | Ishikawa et al. ............. | 165/104.12 |

Primary Examiner—Robert J. Warden
Assistant Examiner—D. John Griffith, Jr.
Attorney, Agent, or Firm—Jones, Tullar & Cooper

[57] ABSTRACT

A reactor in which a compact of hydrogen adsorption alloy is incorporated, comprising a plurality of parallel-bridged thermal reaction elements, each comprising a heat transfer pipe tightly enclosing a hollow cylindrical compact of hydrogen adsorption alloy and a jacket pipe enclosing in parallel, the heat transfer pipe with a path formed therebetween. The reactor achieves a rapid heat exchanging velocity and considerable shortening of reaction time as compared with the prior art.

3 Claims, 2 Drawing Sheets

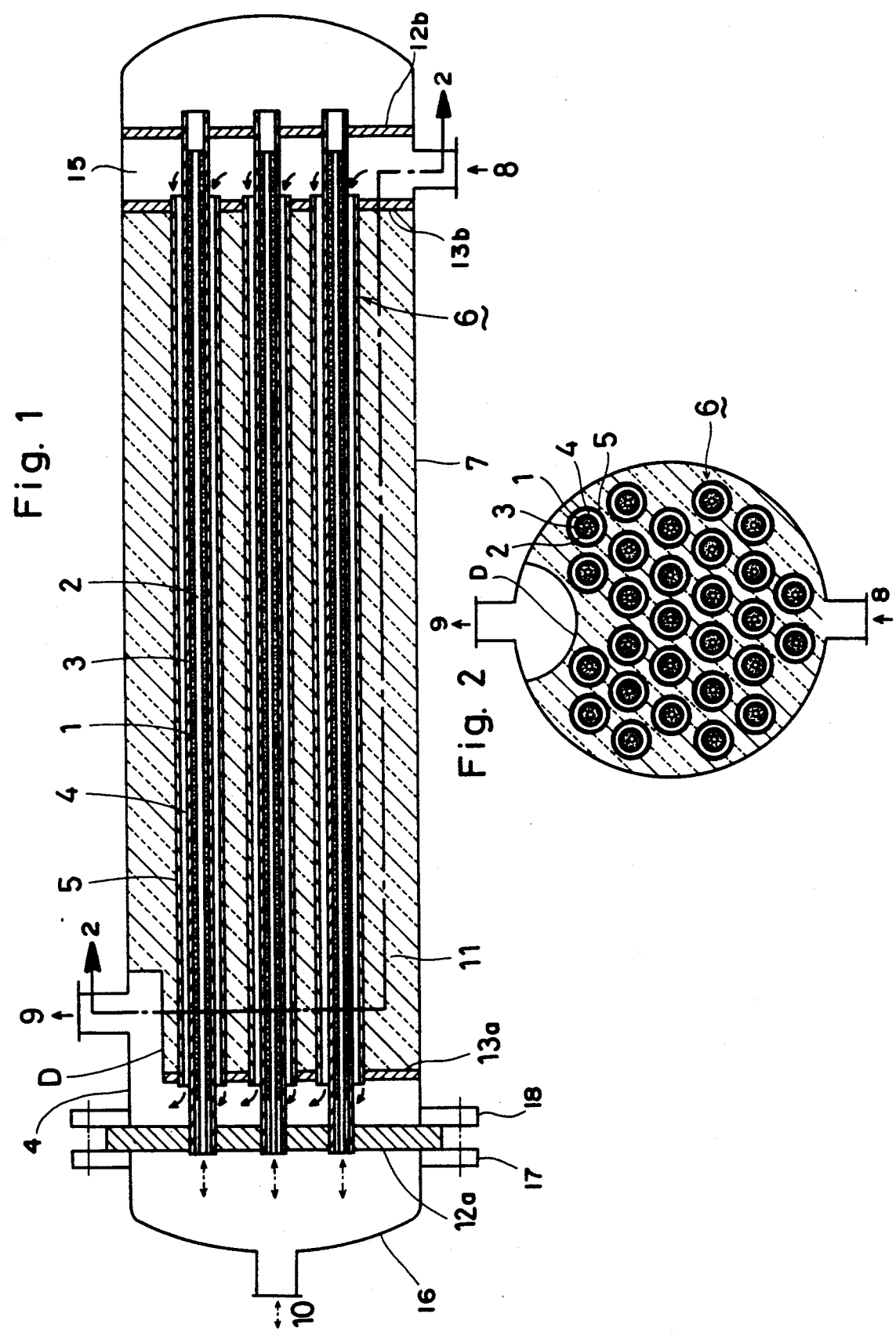

REACTOR WITH HYDROGEN ADSORPTION ALLOY

BACKGROUND OF THE INVENTION

1. Field of the Invention

The present invention relates to a reactor with hydrogen adsorption alloy composed mainly of metal hydride, and, more particularly, to a novel construction of the reactor whose heat exchanger effectiveness is considerably improved as compared with the prior art.

2. Prior art

Heretofore, in several fields apparatus have been developed in which hydrogen is adsorped in a certain metal or alloy to be stored therein and transferred therefrom in the form of a metal hydride, and those apparatuses have been further applied to such practical use as purification of hydrogen, pressure rise, heat pump, airconditioning system, etc.

In such case, because an exothermic reaction or endothermic reaction necessarily takes place at the time the metal hydride adsorbs or discharges hydrogen, it is possible to take advantage of such a property for a heat exchanger, heat pump, etc.

When it is a principal object to store and transfer hydrogen, delivery of hydrogen is not effectively carried out without rapid delivery of heat between the metal hydride and the outside in view of the high thermal efficiency of the heat exchanger, or efficient storage and transfer of hydrogen.

However, thermal conductivity of hydrogen adsorption alloy itself in the form of particles is not high, and therefore several attempts have been proposed aiming at efficient delivery of heat.

According to one of such proposed attempt, in order to improve the hydrogen adsorption alloy itself, surfaces of the particles are plated with a different kind of metal of high thermal conductivity as described later. The applicant of the present invention has already proposed an attempt as is disclosed in Japanese Patent Application No. 59-46161, entitled "Method for Producing Hydrogen Adsorption Alloy". There have also been proposed several attempts to solve the problem by the manner in which the heat exchanging reactor as constructed including the attempt disclosed in the Japanese Laid-Open Utility Model Publication (unexamined) No. 61-193300 (see FIG. 3), entitled "Hydrogen Adsorption Alloy Storage Tank". According to the device disclosed in this laid-open application, a tank is formed of multiple concentric pipes, in which a passage area of heating or cooling medium and a charging area of hydrogen adsorption alloy are alternately located, and the thickness of the alloy charging layer is specified.

A further attempt has been proposed in which hydrogen adsorption alloy is not used in the form of particles but is stored in a tank in the form of a compressively formed compact, as is disclosed in U.S. Pat. No. 4,717,629 (see FIG. 4), Japanese Laid-Open Patent Publication (unexamined) No. 62-196500) entitled "Heat Exchanging Unit with Hydrogen Adsorption Alloy", in addition to the above-mentioned Japanese Patent Application No. 59-46161. It may be said that any of these proposals succeeds in overcoming such drawbacks as low thermal conductivity of the alloy particle charged layer itself, deterioration of such conductivity by decay and micronization of the alloy due to repetition of reaction with hydrogen gas.

The aforementioned prior art, however, still have the following disadvantages or problems to be solved.

When hydrogen gas passes through the layer of hydrogen adsorption alloy in the form of particles, there arises a problem of micronization and dispersion of the particles, which seems to restrict the effectiveness of the hydrogen adsorption alloy, which restriction cannot be overcome by a simple variation or modification of construction of the heat exchanger tank alone. In the prior art shown in FIG. 3, because expansion of the alloy and/or micronization thereof take place increasingly, the bottom part of the alloy becomes condensed and solidified thereby bringing about excessive deformation of the tank, which eventually results in breakdown of the reactor.

In any of the proposals according to which fine compacts are prepared and incorporated in the heat exchanger tank, because the heat exchanger accommodating the compacts still follows the traditional heat exchanger design which does not use hydrogen adsorption alloy, transfer of the heating or cooling medium is so slow that satisfactory improvement in heat exchanger effectiveness cannot be attained. Moreover, because of the large residence time in the tank, it takes a lot of time in the operation of adsorption (cooling) and discharge (heating) of hydrogen gas and in the switching operation therebetween.

SUMMARY OF THE INVENTION

Accordingly, the present invention was developed to solve the above problems and has as an object of providing a novel construction of a reactor with hydrogen adsorption alloy in which the hydrogen adsorption alloy is incorporated, and whose heat exchanger effectiveness is considerably improved as compared with conventional reactors.

To accomplish the foregoing object, the reactor with hydrogen adsorption alloy according to the invention comprises: a hollow cylindrical hydrogen adsorption alloy compact; a heat transfer pipe which tightly encloses the outer periphery of the compact; parallel-bridged thermal reaction elements each comprising a heat transfer pipe and a jacket pipe enclosing in parallel the heat transfer pipe with a gap therebetween forming a path; means for feeding and discharging hydrogen gas to and from a hollow part of the compact; means for feeding and discharging a heating or cooling medium to and from the gap between the heat transfer pipe and the jacket pipe; and a tank which hermetically accommodates all of the foregoing.

It is preferable in view of a further improvement that the gap formed between one thermal reaction element and another is filled with a heat insulating material.

In the reactor of the above construction according to the invention, heat exchange takes place so rapidly between the heating or cooling element and the alloy compact that a significant improvement is achievd in the acceleration of reaction. As a further advantage, residence of the heating or cooling medium is so small that the time necessary for the operations of adsorption and discharge of the hydrogen gas and the time for the switching therebetween are considerably shortened.

Other objects and features of the invention will becomes apparent in the course of the following description with the accompanying drawings.

BRIEF DESCRIPTION OF THE DRAWINGS

FIG. 1 and FIG. 2 are respectively a front sectional view and a side sectional view, taken along lines 2—2 of FIG. 1, of an embodiment of the present invention.

DESCRIPTION OF THE PREFERRED EMBODIMENT

Figure 3:
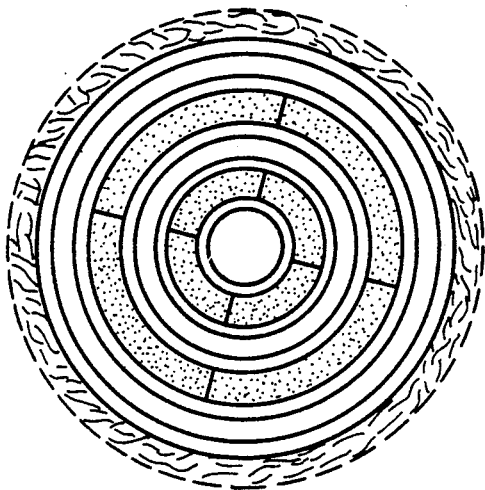
FIG. 3 and FIG. 4 are front and sectional views respectively illustrating different prior art devises.
Figure 4:
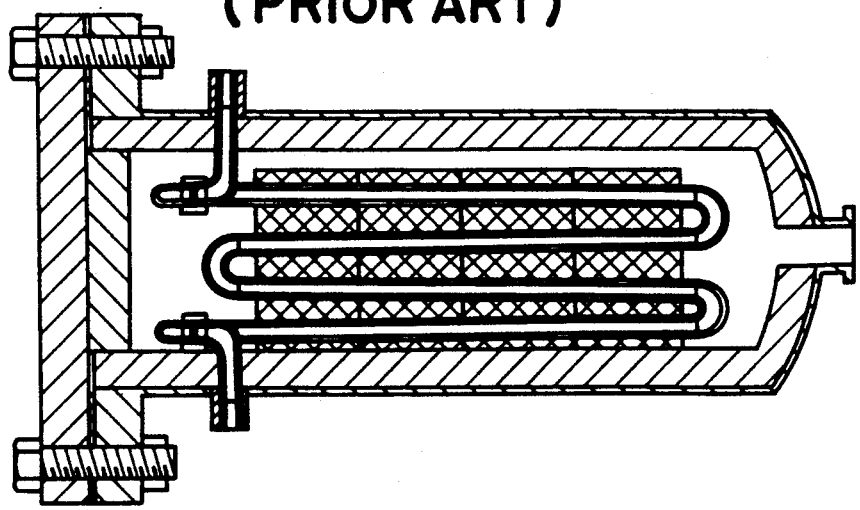

Referring now to the FIG. 1 and FIG. 2 respectively illustrating a front sectional view and a side sectional view of an embodiment according to the present invention, reference numeral 1 indicates a hydrogen adsorption alloy formed into a cylinder with a hollow part 2 inside. For arranging the cylinder, it may be difficult to mold the full length thereof all at once and it will be convenient to prepare several hollow cylindrical compacts of certain length and connect them longitudinally to form an integrated cylinder. Numeral 3 indicates a heat transfer pipe tightly enclosing the outer priphery of the compact 1. This heat transfer pipe 3 is preferably composed of a metal of high thermal conductivity such as Cu, Al. Numeral 5 indicates a conduit, i.e., a jacket pipe which encircles and is parallel to the outer periphery of the heat transfer pipe 3 with a gap therebetween forming a path 4. A thermal reaction element 6 is formed by superposing the heat transfer pipe and the jacket pipe 5. Then, the thermal reaction element 6 is installed in a sealed tank 7. When installing a plurality of thermal reaction elements 6 (28 reaction elements are installed in this embodiment), they are arranged in parallel.

The tank 7 is provided with a medium feeding inlet 8 and a medium discharging outlet 9 to and from which a heating (or cooling) medium is fed and discharged. The heating (or cooling) medium runs rapidly through the path 4 of narrrow section as indicated by the solid arrows in FIG. 1. The tank 7 is also provided with a hydrogen gas feeding and discharging port 10 to and from which hydrogen gas is fed and discharged passing through the hollow part 2 inside the compact as indicated by the broken lines in FIG. 1. By such a construction, flow velocity of the heating (or cooling) medium is very high as compared with the prior art. In addition, it is easy to design and form the path 4 so that it is narrow, whereby the total amount of heating (or cooling) medium retained in the reactor is minimized.

As seen from the above embodiment in FIGS. 1 and 2, the invention is featured by a double pipe structure with the path or gap 4 arranged as narrow as possible so that both heat delivery between the heating (or cooling) medium and the alloy compact, and reaction between the alloy compact and hydrogen gas may be carried out as rapidly as possible. In this sense, other requirements can be rather freely established. It is preferable that, when preparing a hydrogen adsorption alloy, a powder of $MmNi_{4.5}Mn_{0.5}$ is coated with copper by means of a wet electroless plating of autocatalysis with a reducer. Then the treated powder is subject to compressive molding by means of a cold isostatic press or a hydraulic press to be formed into a cylindrical compact. Several pieces of such compacts are inserted in the heat transfer pipe, which is then fitted into the jacket pipe, a thermal reaction element being assembled.

It is also preferable that the treated powder be subjected to compressive molding to be molded integrally with the heat transfer pipe, as is disclosed in detail in the aforesaid Japanese Laid-Open Patent Publication No. 62-196500.

The retained amount of heating (or cooling) medium is effectively reduced by providing a transversely extending stepped portion D at one end of the tank 7 and in an adjacent pipe plate 13a and heat insulating material 11 adjacent the medium discharging outlet 9. The pipe plate 13a holds the jacket pipes 5. A flange 12a is interposed on the medium outlet 9 side as illustrated in FIG. 1, for holding the heat transfer pipes 3 the pipe plates 12a and 13a form a chamber 14, while pipe plates 12b ad 13b, which hold the opposite ends of the jacket pipes 5 and transfer pipes 3, respectively, form a chamber 15.

The tank 7 is closed at one end with a cover 16. Flanges 17 and 18 are provided for this purpose. The flanges are bolted together.

Heat insulation is an important factor which influences the effectiveness of the reactor. In this regard, in the conventional reactor, there is no other means than covering the external part of the sealing tank. On the other hand, in the construction according to the invention, the space between the thermal reaction elements, i.e., the outer periphery of each jacket pipe is directly enclosed with the heat insulating material 11 so as to cut off heat loss.

Described hereinafter is a specific form of the invention.

A stainless reactor for accommodating hydrogen adsorption alloy was first prepared. The dimensions of the reactor were 300 mm in diameter × 1600 mm in length. It was provided with a hydrogen gas feeding and discharging port, a medium feeding inlet and a medium discharging outlet. A plurality of heat transfer pipes, each formed integrally with the hydrogen adsorption alloy whose particle surfaces were coated with copper by means of a wet electroless plating of autocatalysis with a reducer, were arranged in the tank forming an equilateral triangle shape. Steel jacket pipes in the same number as the heat transfer pipes were further arranged respectively adjacent to the outside of the heat transfer pipes to form a double pipe structure, then, being respectively secured by the pipe plate 13, each double pipe structure was installed in the tank. In the hydrogen adsorption alloy encapsulated with copper and integrally formed with the heat transfer pipes, the total weight of $LaN_{4.7}Al_{0.3}$ alloy was about 85 Kg. Gaps between the outside of the jacket pipe and the inside of the tank cell as well as other gaps were filled with a urethane foam serving as an heat insulating material.

In the above embodiment, not only such advantages as improvement in quality of the alloy powder itself, improvement in thermal conductivity by forming into a compact, etc. were achieved in the same manner as the prior art disclosed by the applicant, but also a further advantage of minimizing heat loss and improvement in reaction efficiency by the aforesaid peculiar mounting method of the heat insulating material were achieved. Furthermore, when adopting the construction of interposing a flange while providing the stepped portion D on the pipe plate, such peculiar advantages as prevention of increase of heating (or cooling) medium, prevention of decline in reaction efficiency are achieved.

As various different embodiments of the invention may be made without departing from the spirit and scope thereof, it is to be understood that the invention is not limited to the specific embodiments thereof except as defined in the appended claims.

What is claimed is:

1. A reactor with hydrogen adsorption alloy comprising: a tank defining a transverse direction; at least one hollow cylindrical hydrogen adsorption alloy compact situated in said tank; a heat transfer pipe which tightly encloses the outer periphery of each of said compacts; a thermal reaction element associated with each compact, each thermal reaction element associated with each compact, each thermal reaction element comprising the heat transfer pipe which tightly encloses an associated compact and a jacket pipe enclosing, in parallel, the heat transfer pipe and defining a gap therebetween forming a path; means associated with said tank for feeding and discharging hydrogen gas to and from a hollow part of each compact; further means associated with said tank for feeding and discharging a heating or cooling medium to and from said path between each heat transfer pipe and its associated jacket pipe, said tank hermetically accommodating each compact and associated heat transfer pipe and thermal reaction element; heat insulating material; a pipe plate in said tank which supports and holds the thermal reaction elements; and a further pipe plate in said tank which supports and holds the heat transfer pipes, wherein:

the outer peripheral surface of each thermal reaction element forms with each other thermal reaction element and the inner surface of the tank a space filled with the heat insulating material;

said pipe plate and further pipe plates are situated to define a chamber therebetween within said tank; and said pipe plate and the adjacent heat insulating material forming a transversely extending stepped cutaway portion in said pipe plate and said insulating material, connected to the chamber in said tank.

2. The reactor with hydrogen adsorption alloy according to claim 1, wherein a pipe plate and further pipe plate are arranged together at each end of said tank, thereby defining a pair of spaced apart chambers, with a stepped portion being formed at at least one end of said tank.

3. The reactor with hydrogen adsorption alloy according to claim 1, wherein said further means includes a heating or cooling medium outlet and wherein said stepped portion is situated adjacent said outlet.

* * * * *